United States Patent [19]

Mills et al.

[11] 3,880,747

[45] Apr. 29, 1975

[54] CATALYTIC HYDROFINISHING OF LUBE OIL PRODUCT OF SOLVENT EXTRACTION OF PETROLEUM DISTILLATE

[75] Inventors: Ivor W. Mills, Hacks Point, Md.; Merritt C. Kirk, Jr., McKinney, Tex.; Albert T. Olenzak, Media, Pa.

[73] Assignee: Sun Oil Company of Pennsylvania, Philadelphia, Pa.

[22] Filed: May 4, 1973

[21] Appl. No.: 357,288

Related U.S. Application Data

[60] Division of Ser. No. 70,590, Sept. 8, 1970, Pat. No. 3,732,154, Continuation-in-part of Ser. No. 812,516, Feb. 19, 1969, Pat. No. 3,619,414, Continuation-in-part of Ser. No. 636,493, May 5, 1967, Pat. No. 3,681,279, Continuation-in-part of Ser. No. 622,398, March 13, 1967, Pat. No. 3,462,358, Continuation-in-part of Ser. No. 730,999, May 22, 1968, Pat. No. 3,839,188, Continuation-in-part of Ser. No. 652,026, July 10, 1967, Pat. No. 3,502,561.

[52] U.S. Cl. .................... 208/87; 208/18; 208/141; 208/264
[51] Int. Cl. ...................... C10g 23/02; C10g 31/14
[58] Field of Search ........ 208/18, 87, 264, 143, 141

[56] References Cited

UNITED STATES PATENTS

| | | | |
|---|---|---|---|
| 3,189,540 | 6/1965 | Kozlowski et al. | 208/264 |
| 3,224,955 | 12/1965 | Anderson | 208/28 |
| 3,232,863 | 2/1966 | Watson et al. | 208/36 |
| 3,369,999 | 2/1968 | Donaldson et al. | 208/264 |
| 3,403,092 | 9/1968 | Rausch | 208/36 |
| 3,732,154 | 5/1973 | Mills et al. | 208/87 |

*Primary Examiner*—Herbert Levine
*Attorney, Agent, or Firm*—George L. Church; J. Edward Hess; Barry A. Bisson

[57] ABSTRACT

Hydrofinished petroleum products, useful as lube oils, rubber oils, refrigerator oils, transformer oils, cable oils, ATF and friction drive transmission fluids, etc., can be produced by a process comprising (1) solvent extracting petroleum distillate stock to obtain a raffinate product and an extract product, and (2) contacting at least one of these products with hydrogen, in the presence of a catalyst comprising a hydrogenating component selected from the group consisting of sulfides and oxides of a combination of nickel and molybdenum. The preferred petroleum distillate is naphthenic by viscosity-gravity constant classification.

12 Claims, No Drawings

3,880,747

CATALYTIC HYDROFINISHING OF LUBE OIL PRODUCT OF SOLVENT EXTRACTION OF PETROLEUM DISTILLATE

CROSS REFERENCE TO RELATED APPLICATIONS

This application is a division of Ser. No. 70,590, filed Sept. 8, 1970 now U.S. Pat. No. 3,732,154 and a continuation-in-part of Ser. No. 812,516, filed Feb. 19, 1969 (now U.S. Pat. No. 3,619,414, issued Nov. 9, 1971) and Ser. No. 636,493, filed May 5, 1967 (now U.S. Pat. No. 3,681,279, issued Aug. 1, 1972), all of which are incorporated herein by reference. Ser. No. 812,516 is also a continuation in part of Ser. No. 622,398, filed Mar. 13, 1967 (now U.S. Pat. No. 3,462,358, issued Aug. 19, 1969); Ser. No. 730,999, filed May 22, 1968 (now U.S. Pat. No. 3,839,188, issued Oct. 1, 1974); and Ser. No. 652,026, filed July 10, 1967 now U.S. Pat. No. 3,502,567, issued Mar. 24, 1970).

BACKGROUND OF THE INVENTION

This invention relates to single or multiple stage hydrofinishing (which includes hydrogenation, hydrorefining, hydroaromatization) of petroleum distillate in the lubricating oil boiling range and, especially, of naphthenic distillates boiling mainly above 580°F. One characteristic of such hydrofinishing is that the product contains at least 50 percent by weight less polar aromatic compounds by ASTM D-2007, than the feed. The invention involves solvent extraction with an aromaticselective solvent, such as furfural, phenol, $SO_2$, etc. and hydrofinishing at least one product of the extraction. The hydrofinished products are useful in the production of lube oils, rubber oils, refrigerator oils, transformer oils, cable oils, ATF and friction drive transmission fluids, etc.

The hydrorefining process comprises contacting an extract or raffinate, of lube oil viscosity (40-12,000 SUS at 100°F.) with hydrogen in the presence of a catalyst comprising a hydrogenating component selected from the group consisting of sulfides and oxides of a combination of nickel and molybdenum. The extract or raffinate is preferably obtained from a naphthenic distillate. Preferably, the hydrogenating component is composited with an inorganic oxide support (preferably refractory) such as silica or alumina, and the contacting is carried out at an average catalyst temperature of about 500°–800°F, an LHSV of 0.1–8.0 (based on the fresh feed) with from 500–3,000 p.s.i. of hydrogen entering the reactor. The combination of conditions is so selected as to effect either hydrogenation, "autofining" (i.e., removal of polar aromatics with little or no net change in the total weight percent aromatics) or dehydrogenation, but with no substantial cracking to hydrocarbons boiling below the lube oil range (generally, less than 10 volume percent of the product boils below 550°F). Gas (e.g. hydrogen) recycle can be from 0–20,000 SCF/bbl.

DESCRIPTION OF THE INVENTION

The feed material to the solvent extraction can be any petroleum distillate but preferably is naphthenic. It will boil mainly above 580°F, i.e., in the lube oil range, and will have a viscosity of 40–12,000 SUS at 100°F. The definition of "naphthenic" in copending application Ser. No. 228,832, filed Feb. 24, 1972 is incorporated herein.

The solvent extraction employs a conventional aromatic selective solvent such as those mentioned above and can be effected in conventional manner employing e.g., solvent-oil ratios of 1–4 to 1, temperatures of 100°F–250°F and extract yields of 10–30 percent. The raffinate will contain less aromatics than the feed usually no more than 40 percent, and the extract will contain more aromatics than the feed usually 25–85 percent. The extraction can be conducted "hot" or "cold" (see U.S. Pat. No. 3,514,395).

The catalyst comprises a combination of oxides or sulfides of nickel and molybdenum. The catalyst metal is preferably in sulfide form and preferably is on a support which has low hydrocracking activity such as silica, $\alpha$-alumina, bauxite, alumina-titania and aluminosilicates (either crystalline or amorphous). When the carrier is an alumino-silicate which has acid (cracking) activity, the reaction conditions are preferably controlled so as to avoid excessive hydrocracking. These metal-oxide catalyst combinations are preferably presulfided (as by contacting with $H_2S$, $CS_2$, etc.) before use in the hydrofinishing process. Other metals can also be present such as chromium, tungsten, cobalt, iron and the like. Examples of operable catalysts are those of U.S. Pat. Nos. 2,744,052; 2,758,957; 3,053,706; 3,182,016; 3,205,165; 3,227,646 and 3,264,211 containing nickel and molybdenum. In oxide form, the catalysts can also contain $Fe_3O_4$ or CuO prior to sulfiding in addition to Ni and Mo. The Ni and Mo can be present either as the metal and/or an oxide prior to the sulfiding. The amount of molybdenum is usually 2–25 weight percent and the ratio of any other metal to molybdenum is less than about 0.4. Useful catalysts are the Ni-Mo catalysts shown in U.S. Pat. Nos. 3,424,673; 3,594,307 and I & E CHEM., 51, (No. 11), pages 1,349–1,350 (Nov. 1959)

A useful commercially available Ni-Mo catalyst (preferably presulfided), in the production of electrical oils is available under the tradename "Aero HDS-3" (3 percent NiO and 15 percent $MoO_3$), or "Aero HDS-3A," which is the same composition in a smaller particle size. Additional advantage is found when such a catalyst as "HDS-3" and "HDS-3A" is impregnated with additional Ni (as to produce a catalyst analyzing from 5–20 percent Ni in the oxide form). The NiCoMo catalyst which is available commercially from Universal Oil Products Corporation under the designation "S-6" and analyzing 0.5–1 percent Co, about 3 percent Ni and about 7 percent Mo, on $Al_2O_3$, is particularly useful in the production of a transformer oil.

The hydrofining is carried out at a temperature of about 500°–800°F, at a space velocity of about 0.1–8.0 liquid volumes of oil per volume of catalyst per hour based on the fresh feed, and at a pressure of about 500–3,000 p.s.i. of hydrogen, the combination of conditions being so selected as to effect appreciable hydrogen consumption but no substantial cracking, and wherein said lubricating oil distillate stock is extracted with an aromatic selective solvent prior to said hydrogenation. For hydrogenation (i.e., saturation or partial saturation) of aromatic components of the feed (particularly, of an extract) the temperature can be in the range of 575°–700°F (more preferred 625°–680°F, most preferred about 650°F) and the hydrogen partial pressure is preferably in the range of 800–3,000 p.s.i.

For aromatization (as of a raffinate from furfural extraction of a naphthenic distillate) the temperature can be in the range of 685°–765°F; however, the preferred temperature is in the range of 725°–765°F (more preferred about 750° F) and the hydrogen partial pressure is preferably maintained in the range of 500–1,500 p.s.i. Depending on the pressure, space velocity and the nature of the extract or raffinate which is being hydrofinished, temperatures in the range of 685°–725°F can effect a net hydrogenation of aromatics (e.g., the net consumption of hydrogen can be 150 SCF/bbl. and up) no hydrogenation, or a net dehydrogenation of naphthenes (i.e., hydroaromatization). The data in U.S. Pat. No. 3,681,279 (for naphthenic distillate feed) are illustrative of this phenomenon. The feed to the hydrofining is preferably a raffinate.

Where the charge stock to the hydrofinishing step is highly aromatic (such as heavy aromatic extracts obtained by extraction of aromatic or naphthenic distillate oils with an aromatic-selective solvent or with a Lewis acid), temperatures as low as 450°F and pressures as low as 500 p.s.i.g. can be used to obtain a satisfactory decrease in the ultraviolet absorptivity at 260 millimicrons; however, the preferred conditions include a temperature of at least 650°F (typically, 650°–680°F) and pressures of at least 800 p.s.i. of hydrogen (typically 1,200–1,300 p.s.i.) and wherein the hydrogen is from 50–100 percent pure (typically "reformer" hydrogen of 65–85 percent purity). For highly aromatic charge stocks (e.g., having a 260 UVA greater than 80), lower hydrogen pressures can be used, particularly with a catalyst containing Ni and Mo or Ni, Co and Mo, to successfully reduce the 260 UVA. For example, with NiCoMo (Filtrol 500-8) at 500 p.s.i.g. of pure hydrogen, an LHSV of 0.5 and a gas recycle of 4,000 SCF/bbl., an aromatic oil having a 260 UVA of 114 can be reduced to a UVA of 52 at a contact temperature of 600°F, to about 68 at 625°–650°F.

The reaction conditions (particularly the temperature) are preferably chosen such that no substantial cracking occurs; that is, no more than 20 percent (preferably less than 10 percent) of the feed stock is converted to material boiling below 300°F (more preferred, no more than 10 volume percent of the product boils below 550°F).

Although the maximum hydrorefining or hydroaromatization temperature which will not produce substantial cracking is somewhat dependent upon the space velocity, the type of catalyst and the pressure, generally it is below 750°F. For severe hydrorefining under conditions where the gel aromatic content of the original feed stock is not substantially increased but where the 335 UVA is sufficiently great to impart reasonable oxidation stability to the product, the preferred conditions include a temperature in the range of 650°–680°F. Preferred hydrogen pressures at the reactor inlet are in the range of 800–3,000 p.s.i. (wherein the hydrogen is from 50–100 percent pure) and, more preferably, a hydrogen pressure at the reactor inlet in the range of 1,200–1,300 p.s.i. In the usual fixed bed hydrogenation reactor, the purity of the hydrogen, and, thus, the partial pressure exerted by the hydrogen decreases as the gas moves through the bed and hydrogen is consumed. Therefore, we prefer to refer to the hydrogen pressure in our process in terms of the partial pressure of the hydrogen at the reactor inlet, in order that at least some of the feed is insured contact with a specified minimum concentration of hydrogen.

Typical of severe hydrorefining methods which can be used in our process when conducted within the processing conditions referred to herein are those of U.S. Pat. Nos. 2,968,614; 2,993,855; 3,012,963; 3,114,701; 3,144,404 and 3,278,420.

As has been long known in the art (e.g., see U.S. Pat. No. 2,726,193) a usual (and useful) processing technique in conjunction with hydrogenations which effect hydrodesulfurization of petroleum stocks is to "flashoff" the $H_2S$ produced (which can, in part, be dissolved in the oil).

Clay finishing of the catalytically hydrofinished product can be advantageous where it is desired to have such additional improvement as low initial dissipation factor (IDF) or lighter initial color. The clay finishing can utilize acid activated adsorbent clay (e.g. see U.S. Pat. No. 3,462,358). For many oils, the additional improvement imparted by clay treatment of the hydrorefined product can be justified economically. Such oils include the electrical oils, refrigerator oils, highly aromatic plasticizers for rubber or vinyl (e.g., those containing at least 45 percent of aromatics) and traction fluids.

As has been shown in U.S. Pat. No. 3,681,279 it is sometimes advantageous in the clay finishing of electrical oils, such as cable oils, to utilize a critical dosage of an acid-activiated clay or a combination of acid-activated clay and attapulgite in order to obtain the desired electrical characteristics. The catalyst and hydrogenation conditions disclosed in said U.S. Pat. No. 3,681,279 are useful in practice of the present invention when it is desired to produce an electrical oil or a refrigeration oil. Also useful are the adsorbent admixtures (and process conditions) disclosed in U.S. Pat. No. 3,369,999 for the decolorizing of waxes.

Product recycle, for example, as in U.S. Pat. No. 2,900,433, can be used, preferably at a product to feed fresh ratio below 10:1 (more preferably, 8:1 to 1:1).

Some of the more important aspects of the invention with respect to specific types of oils are as follows:

One aspect of the invention involves preparing an aromatic hydrocarbon fluid having a reduced tendency to discolor upon aging (e.g. as in the presence of ultraviolet light) and which is useful as a rubber processing oil. Such a fluid can be prepared by a one or two-step hydro-aromatization process wherein the feed is a raffinate or extract of a naphthenic distillate boiling mainly above 580°F, said feed having a viscosity in the range of 40–10,000 SUS at 100°F and containing nonhydrocarbon impurities comprising organic heterocyclic sulfur and nitrogen compounds and containing no more than 40 percent aromatic hydrocarbons, if a raffinate, and in the range of 25 percent to 85 percent aromatics, if an extract. For such hydroaromatization, the preferred hydrogen partial pressure is in the range of 500–1,000 p.s.i. and the preferred temperature is in the range of 725°–765°F (e.g. about 750°F), the liquid hourly space velocity being typically in the range of 0.1–5.

Another aspect of the invention involves a process for producing electrical grade oils (.e.g. cable oils, transformer oils) comprising contacting a furfural raffinate of a naphthenic distillate (said raffinate and said distillate having a viscosity in the range of 40–10,000 SUS at 100°F) with hydrogen and a nickel-containing catalyst from one of the aforementioned classes, preferably under hydrogenation conditions selected as to effect appreciable hydrogen consumption but no substantial cracking and contacting the resulting hydrorefined oil with clay. Similarly, a single stage hydrogenation can be used to prepare a refrigerator oil from a furfural extract of a naphthenic distillate, as by using a catalyst comprising Ni-W on $Al_2O_3$.

Another aspect of this invention relates to the removal, by the present hydrofinishing process, of nitrogen and sulfur and the saturation of the aromatics in the raffinate or extract product from a naphthenic or paraffinic distillate to less than 2 weight percent preferably, less than 1 percent, typically 0.0 to 0.5 percent, to prepare a useful fluid in toric or friction drive transmissions (i.e. a "traction fluid," see U.S. Pat. No. 3,595,796).

The above-identified application Ser. No. 636,493 discloses that hydrorefining of "1300 SUS furfural raffinate of a 2400 SUS naphthenic distillate" produced a refined oil which had a low content polar aromatics, was light-colored, had good ultraviolet stability, and was useful as a plasticizer or extender for light-colored rubber vulcanizate.

U.S. Pat. No. 3,514,395, discloses a method for producing high aromatic oils which are stable to ultraviolet light and have low color characteristics which comprises subjecting a highly aromatic extract stream of a reduced crude oil feed to a mild hydrogenation process in the presence of a hydrogenation catalyst at a temperature in the range of 400° to 675°F, a hydrogen pressure of 200 to 1,500 p.s.i., and a liquid hourly space velocity of 0.1 to 5.0 per hour, and thereafter selectively solvent-treating the hydrogenated base stock at a temperature in the range of 60° to 120°F and a solvent dosage of 50 to 300 percent with selective solvent for aromatics. The preferred catalyst disclosed for this process is nickel-molybdenum on an alumina support, presulfided with 10 percent hydrogen sulfide in hydrogen.

One process for producing good yields of transformer grade oils having good response to DBPC additive and good stability comprises contacting a naphthenic distillate oil with hot furfural (e.g. 190°F, 170 percent) to produce a raffinate having an aromatics content less than 30 percent (e.g., no greater than 25 percent), an alkane content not greater than 5 percent, the balance being substantially all naphthenes, and having a flash point not less than 275°F, a viscosity at 100°F of about 50 to 85 SUS, and a viscosity at 32°F of not more than about 280 SUS, and contacting this raffinate with about 500 to 4,000 SCF/bbl. of a hydrogen-containing gas containing at least 60 percent hydrogen with a catalyst comprising a hydrogenating component selected from the group consisting of sulfides and oxides of (a) nickel and molybdenum, (b) a combination of about 4 to 16 percent by weight molybdenum and nickel and at least one other iron group metal, where nickel and the other iron group metal are present in such amounts that the ratio of each iron group metal to molybdenum is less than about 0.4, the hydrogenating component being composited with an alumina support, and the contacting being carried out at an average catalyst temperature of about 575°–645°F, at a space velocity of about 0.25 to 3 liquid volumes of oil per volume of catalyst per hour, and at a pressure of about 1,000 to 1,800 p.s.i.g., (with 80 to 100 percent hydrogen); the combination of conditions being so selected as to effect appreciable hydrogen consumption but no substantial cracking, stripping the hydrogenated oil at a temperature of about 325°–600°F to remove hydrogen sulfide, and clay treating the stripped hydrogenated oil in a proportion not exceeding about 250 barrels of oil per ton of clay.

Copending application Ser. No. 730,999 (incorporated herein by reference) discloses in detail the effect upon the properties of the resulting transformer oil (especially regarding the 335 UVA, gel aromatics and sulfur and nitrogen removal) when such hydrogenations are conducted at temmperatures in the range of about 500°–800°F (and at pressures above 800 p.s.i. of $H_2$). The teachings of that application can be used with raffinates from naphthenic distillates to "tailor-make" transformer oils, having particular desired combinations of oxidation stability and impulse breakdown strength. To minimize the ultraviolet absorptivity at 335 millimicrons (i.e., 335 UVA), a preferred temperature range is about 575°–645°F (600°F being about the minimum point), such low 335 UVA and low nitrogen content transformer oils have good response to the usual oxidation inhibitors used in transformer oils. However, when it is desired that the uninhibited oil has a long sludge-free life under the Doble test conditions, the hydrorefining conditions should be such as to both lower the nitrogen to less than 25 p.p.m. (preferably less than 15 p.p.m.) and also to increase the 335 UVA to greater than 0.04 (preferably at least 0.06). Such low nitrogen and relatively high 335 UVA in a hydrorefined transformer oil can be obtained in the present process when at least one portion of hydrogenation includes temperatures greater than 680°F (e.g. 685°–765°F) in order to effect a minor degree of hydroaromatization.

Hydrorefined oils having viscosities in the range of 40–2,000 SUS at 100°F, nitrogen below 25 p.p.m. and a 335 UVA greater than 0.04 can also be useful as coolants for a nuclear reactor since they have good stability when exposed to nuclear radiation.

Examples of the preparation of rubber oils (either of low 260 UVA and aromaticity or of high 260 UVA and aromaticity) can be found in U.S. Pat. No. 3,681,279. Such oils are useful as plasticizers in rubber (especially in EPDM). Clay treatment (as with 10–200 lb. attapulgite per bbl. of oil) can improve at treating temperatures above 650°F (and which contain less than 2 percent of polar compounds) are preferred for use in butyl rubbers, ethylene propylene rubbers and EPDM rubbers, since such rubber oil compositions (especially when they also contain carbon black) have improved tensile strength and modulus.

Examples of the preparation of cable oils (having, for example, viscosities greater than 500 SUS at 100°F and a 260 UVA less than 8), can be found in U.S. Pat. No. 3,681,279. For example, after clay treatment, a hydrogenated cable oil, produced from a hydrorefined raffinate, can have a viscosity greater than 2000 SUS at 100°F, an IDF less than 0.001 and an ADF less than 0.01.

Highly aromatic non-discoloring rubber process oils (e.g., 45–90 percent aromatics) can be prepared from extracts by hydrorefining under conditions such that the aromatic content of the oil is essentially maintained, or is increased (as by hydroaromatization).

In preparing cable oils a combination of solvent extraction and acid treatment allows the production (from the raffinate) of a less polar oil of given aromatic content than can be produced solely by extraction with an aromatic selective solvent, such as furfural, $SO_2$ or phenol. For example, furfural extraction of a 2400 SUS (at 100°F) distillate containing 47.5 percent aromatics (260 UVA of 11) and 2.7 percent polar compounds can produce a 1,200 SUS oil containing 31.6 percent aromatics (260 UVA of 2.5) and 1.0 percent compounds. In contrast, when the 31.6 percent aromatic content raffinate is treated with 10 lbs. of HF per 100 lbs. of oil, the resulting neutral oil contains 31.2 percent aromatics and 0.5 percent polar compounds. When this acid-treated, furfural raffinate is hydrorefined and contacted with bauxite, the resulting cable oil has an ADF that is at least as low as that exhibited by commercially available polybutene oils of the same viscosity.

EXAMPLE I

A naphthenic distillate in the transformer oil boiling range is contacted with hot furfural and the raffinate product hydrogenated over presulfided UOP "S-6" catalyst at a temperature of 680°F, 1500 p.s.i.g. of pure hydrogen, at an LHSV of 0.4 and a hydrogen:oil ratio of 4–5 moles per mole to produce a hydrorefined oil which is greatly reduced in polycyclic aromatic compounds and which contains less sulfur and gel aromatics than did the original charge stock. The hydrorefined oil has a Doble life of about one day. After contacting with a clay (e.g. 5–40 lbs. of attapulgite per bbl. of oil) such an electrical oil can have a Doble life in the order of 2 to 3 days (see U.S. Pat. No. 3,406,111 for a description of the Doble test). Table I shows typical results which can be obtained by such a hydrorefining with Ni-Co-Mo catalyst.

TABLE I

|  | CHARGE STOCK | HYDROFINISHED PRODUCT |
| --- | --- | --- |
| Aromatics by silica gel, wt. % | 37.7 | 23.6 |
| Monocyclic aromatics | 24.5 | 22.5 |
| Dicyclic aromatics | 11.6 | 1.0 |
| Tricyclic aromatics | 1.6 | 0.1 |
| Sulfur, wt. % | 0.19 | 0.03 |
| Nitrogen, p.p.m. | 63 | 1 |

These data indicate that at these conditions UOP "S-6" has a fairly good activity for hydrogenation of monocyclic aromatics. Similar degrees of hydrogenation can be obtained with raffinates containing a lower weight percent aromatics (e.g. 25 percent).

EXAMPLE II

A naphthenic distillate in the transformer oil boiling range was contacted with hot furfural and separate portions of the raffinate product were hydrogenated over presulfided "Aero HDS-3" catalyst at temperatures of 700°, 725° and 750°F, respectively. Other conditions for each run were 500 p.s.i.g. of pure hydrogen, at an LHSV of 1.0 and a gas recycle of 5,000 SCF/bbl. Compared to the raffinate charge, the product of each run contained much less sulfur and nitrogen than did the original charge stock. Table II reports analytical data on the products obtained at each hydrorefining temperature.

TABLE II

HYDROFINISHING OF RAFFINATE FROM NAPHTHENIC DISTILLATE
Catalyst: American Cyanamid "Aero HDS-3",
⅛", 500 cc, 319 gm Operating Conditions

| Temperature, °F | 700 | 725 | 750 |
| --- | --- | --- | --- |
| Total Pressure, p.s.i.g. | 500 ⟶ | | |
| LHSV, v./hr./v. | 1.0 ⟶ | | |
| Gas Recycle, SCF/bbl. | 5000 ⟶ | | |
| Make-up Gas, mol. % $H_2$ | 100 ⟶ | | |

Product Data

| Aromatics, wt. % | Raffinate Charge | | | |
| --- | --- | --- | --- | --- |
| Mono | 26.8 | 28.1 | 29.2 | 29.2 |
| Dicyclic | 8.5 | 5.2 | 6.2 | 8.3 |
| Tricyclic | 0.3 | 1.0 | 1.0 | 2.0 |
| Total | 35.6 | 34.3 | 36.4 | 39.5 |
| Total Nitrogen, p.p.m. | 27 | 11 | 11 | 7 |
| Sulfur, p.p.m. | 1100–1700 | 6–16 | 21–24 | 11–19 |

This example shows that in the temperature range of 700°–750°F, our hydrofinishing process can be used to produce a hydrofinished product containing a lower weight percent aromatics than the feed (e.g. at 700°F) or can be used to produce a hydrofinished product having about the same total weight percent of aromatics (e.g. at a temperature between 700° and 725°F) or can be used to produce a hydrofinished product having a total weight percent aromatics greater than that of the feed stock (e.g. by hydro-aromatization at a temperature of 725°F or greater).

When the hydrofinishing of this example was done at 775°F, hydrogen was produced at a sufficient rate to cause the unit pressure to increase as the run proceeded; however, the 750°F product was preferred since it contained less products boiling below 550°F.

EXAMPLE III

A solvent extracted naphthenic distillate was hydrofinished at 650°F in accordance with the invention with a Ni-Mo catalyst (American Cyanamid "HDS-3A") in both the sulfided and unsulfided form. The ASTM D-1500 color of the product was 3 with the sulfided catalyst and 6¼ with the unsulfided catalyst. This shows the desirability of presulfiding the catalyst.

The invention claimed is:

1. Hydro-aromatization process for producing improved lubricating oil stocks comprising (a) extracting a lube oil distillate stock with an aromatic selective solvent to obtain a less aromatic raffinate product and a more aromatic extract product, and (b) contacting said raffinate, with hydrogen in the presence of a catalyst consisting essentially of an oxide or sulfide of nickel and molybdenum, said contacting being carried out at a temperature of about 725°–765°F, an LHSV of 0.1-1.0, and a hydrogen pressure of about 500–3,000 p.s.i.g., the combination of conditions being selected so as to effect appreciable hydrogen consumption, but no substantial cracking, such that the product of said contacting has a greater weight percent monocyclic and total aromatics than said product of said extraction.

2. Process according to claim 1 wherein the hydrogenated oil is clay treated.

3. Process according to claim 1 wherein the nickel and molybdenum are in the sulfide form.

4. Process according to claim 1 wherein the viscosity of the products in Step (b) is 40–12,000 SUS at 100°F.

5. Process according to claim 4 wherein said distillate stock is naphthenic and said pressure includes 500–1,500 psi hydrogen.

6. A hydro-aromatization process for producing an electrical oil, a rubber oil or a refrigerator oil comprising contacting a raffinate product from extraction of a naphthenic distillate stock with an aromatic selective solvent, said product having a viscosity in the range of 40–10,000 SUS at 100°F, with hydrogen in the presence of a catalyst selected from the group consisting of oxides or sulfides of a combination of molybdenum and nickel, said contacting being carried out at a temperature of about 725°–765°F, an LHSV of 0.1-1.0, a pressure at the reactor inlet of 500–3,000 p.s.i.g. of hydrogen, the combination of conditions being selected so as to effect appreciable hydrogen consumption and an increase in the weight percent monocyclic and total aromatics, but no substantial cracking, and clay treating the hydrogenated oil.

7. Process according to claim 6 wherein said temperature is about 750°–765°F and wherein the product of said hydrogen contacting contains no more than 25 percent of the total nitrogen which was contained in said raffinate.

8. Process according to claim 6 wherein said catalyst is in the sulfide form.

9. Process according to claim 6 wherein the hydrogenated oil is thereafter contacted with an acid activated adsorbent clay.

10. A hydro-aromatization process for hydrofinishing petroleum distillate in the 40–12,000 SUS viscosity range comprising (a) solvent extracting said petroleum distillate to obtain a less aromatic raffinate product and a more aromatic extract and (b) contacting said raffinate product with hydrogen, in the presence of a hydrogenation catalyst consisting essentially of a combination of nickel and molybdenum sulfide, said contacting being carried out at an average catalyst temperature of about 725°–765°F, and with at least 500 p.s.i. of hydrogen, the combination of conditions being selected as to effect appreciable hydrofinishing, but no substantial cracking, and such that the product of said hydrofinishing has a greater weight percent monocyclic and total aromatics than did said raffinate product.

11. Process according to claim 10 wherein said temperature is in the range of 725°–750°F at 500–1,500 psi hydrogen.

12. The process of claim 10 wherein said petroleum distillate is a transformer oil stock and the product of said contacting with hydrogen contains no more than 11 p.p.m. total nitrogen.

* * * * *